United States Patent [19]

Redey et al.

[11] Patent Number: 4,849,309

[45] Date of Patent: Jul. 18, 1989

[54] OVERCHARGE TOLERANT HIGH-TEMPERATURE CELLS AND BATTERIES

[75] Inventors: Laszlo Redey, Downers Grove; Paul A. Nelson, Wheaton, both of Ill.

[73] Assignee: The United States of America as represented by the United States Department of Energy, Washington, D.C.

[21] Appl. No.: 227,021

[22] Filed: Aug. 1, 1988

[51] Int. Cl.$^4$ .................. H01M 10/44; H01M 10/39
[52] U.S. Cl. .................................. 429/50; 429/112; 429/218; 429/221
[58] Field of Search .................. 429/112, 50, 218, 221

[56] References Cited

U.S. PATENT DOCUMENTS

| | | | |
|---|---|---|---|
| 3,957,532 | 5/1976 | Settle et al. | 136/75 |
| 4,079,303 | 3/1978 | Cox | 320/17 |
| 4,172,926 | 10/1979 | Shimotake et al. | 429/112 |
| 4,238,721 | 12/1980 | DeLuca et al. | 320/18 |
| 4,324,846 | 4/1982 | Kaun et al. | 429/112 |
| 4,414,093 | 11/1983 | Redey et al. | 204/412 |
| 4,728,590 | 3/1988 | Redey | 429/221 |

OTHER PUBLICATIONS

Redey et al, Investigation of Primary Li-SI/FeS$_2$ Cells, ANL-87-6 (1987).
Redey, Power Performance of LiAlSi/(FeNi)S$_2$ Cells, ANL-86-40, International Workshop on High Temp. Molten Salt Batteries, pp. B-131 to B-137 (1986).
Gay et al, "Li-Alloy/FeS Cell Design and Analysis Report", ANL-84-93 (1985), pp. 5 and 37-38.
Chemical Technology Division Annual Tech. Report 1986, ANL-87-19 p. 15.
Redey, Chemical Mechanism for Overcharge Protection in Lithium-Alloy/Metal Disulfide Cells, The Electrochemical Society-Joint International Symposium on Molten Salts, 1987.
Kaun et al, Lithium/Disulfide Battery R&D, 8th Battery and Electrochemical Contractors Conference 11/16-19/87.

Primary Examiner—Donald L. Walton
Attorney, Agent, or Firm—Hugh W. Glenn; Robert J. Fisher; Judson R. Hightower

[57] ABSTRACT

In a lithium-alloy/metal sulfide high temperature electrochemical cell, cell damage caused by overcharging is avoided by providing excess lithium in a high-lithium solubility phase alloy in the negative electrode and a specified ratio maximum of the capacity of a matrix metal of the negative electrode in the working phase to the capacity of a transition metal of the positive electrode. In charging the cell, or a plurality of such cells in series and/or parallel, chemical transfer of elemental lithium from the negative electrode through the electrolyte to the positive electrode provides sufficient lithium to support an increased self-charge current to avoid anodic dissolution of the positive electrode components above a critical potential. The lithium is subsequently electrochemically transferred back to the negative electrode in an electrochemical/chemical cycle which maintains high self-discharge currents on the order of 3-15 mA/cm$^2$ in the cell to prevent overcharging.

18 Claims, 6 Drawing Sheets

| FIRST, POSITIVE ELECTRODE: METAL SULFIDE |
| LIQUID OR IMMOBILIZED ELECTROLYTE |
| SECOND, NEGATIVE ELECTRODE: LITHIUM ALLOY |

OVERCHARGE TOLERANT HIGH-TEMPERATURE CELLS AND BATTERIES

CONTRACTUAL ORIGIN OF THE INVENTION

The United States government has rights in this invention under Contract No. W-31-109-ENG-38 between the U.S. Department of Energy and Argonne National Laboratory.

BACKGROUND OF THE INVENTION

This invention relates generally to the re-charging of electrochemical cells having lithium-alloy negative electrodes and is particularly directed, but not limited, to protecting a high temperature lithium-alloy/metal sulfide cell and batteries from damage due to overcharging.

Lithium-alloy/metal sulfide cells are characterized by high storage capacity and power capability per unit weight. The individual cells are typically of the high-temperature type and are coupled in series and/or parallel to form batteries for the storage of electric power.

Re-charging of lithium-alloy/metal sulfide cells is typically carried out in a region where the voltage of the negative electrode is maintained at a constant, well defined level. If this voltage level is exceeded, the positive electrode may reach a higher potential condition in which iron chloride is formed, where the positive active material or current collector is an iron-based material, with the iron chloride then dissolving in the electrolyte. The dissolved iron chloride is then transferred via the electrolyte to the negative electrode or to the separator area resulting in destruction of the positive electrode and a shorting condition within the cell when the iron precipitate bridges the two electrodes. These conditions caused by cell overcharging will result in the destruction of the cell. With a plurality of lithium alloy/metal sulfide cells coupled together to form a battery, overcharge of the weak cells of the battery is a serious problem whenever there is a disparity in the utilizable capacities of the cells. Maintaining the charge voltage at or below a permissible voltage limit that does not produce any harmful effects on cell cycle life while allowing for the simultaneous attainment of equal capacity in each serially connected cell of a metal sulfide battery, cell capacity equalization, over many cycles are difficult tasks. Various approaches have been adopted to avoid cell overcharging and prevent cell damage and short circuit.

One prior art approach for battery overcharge protection makes use of $Li_2S$ in the positive electrode to provide a chemical overcharge tolerance by a polysulfide shuttle mechanism. The polysulfide shuttle mechanism is limited to cells having disulfide, e.g., $FeS_2$ or $NiS_2$ positive electrodes and is not applicable to lithium-alloy/monosulfide cells. U.S. Pat. No. 4,324,846 to Kaun et al utilizes a ternary alloy of iron-aluminum-lithium or nickel-aluminum-lithium or cobalt-aluminum-lithium to provide a specific overcharge capacity to afford a limited overcharge protection. Electric overcharge protection has also been employed such as taught in U.S. Pat. Nos. 4,079,303 to Cox and 4,238,721 to DeLuca et al. These patents disclose electrical systems for charging multicell storage batteries in a manner which prevents individual cell overcharging. The former patent removes any cell from the charging cycle which reaches a predetermined charge voltage limit, while the latter equalizes the charge of each individual cell at a selected full charge voltage by shunting current around any cell having a voltage exceeding this selected voltage.

The present invention does not employ extra electrical circuitry to prevent detrimental overcharge of the cell. The present invention is particularly adapted for preventing overcharge of a battery comprised of a plurality of lithium-alloy/metal sulfide cells by electrochemical means.

OBJECTS AND SUMMARY OF THE INVENTION

Accordingly, it is an object of the present invention to provide an improved electrochemical cell.

It is another object of the present invention to prevent overcharge damage in a high temperature electrochemical cell.

Yet another object of the present invention is to increase the self-discharge characteristics of a lithium-alloy/metal sulfide cell during re-charging as the cell approaches the fully charged state in order to avoid detrimental overcharging of the positive electrode.

A further object of the present invention is to provide for improved re-charging of a battery comprised of a plurality of high temperature lithium-alloy/metal sulfide cells connected in series and/or parallel.

A still further object of the present invention is to control the self-discharge rate of a high temperature lithium-alloy/metal sulfide cell during re-charging by providing a selected sequence of electrochemical phase transformations as determined by the capacity of the negative electrode matrix metal in the working, or operating, phase and its potential capacity in the high lithium activity phase.

Another object of the present invention is to increase the reliability and operating lifetime of a high temperature lithium-alloy/metal sulfide electrochemical cell.

A further object of this invention is to utilize chemical overcharge protection by a lithium shuttle for fully charged cells in a battery of cells while the charge of the battery is being continued.

Another objective of this invention is to use economical, inexpensive positive current collector metals by allowing better control of the maximum potential of the positive electrode.

This invention contemplates a lithium-alloy/metal sulfide cell with overcharge protection comprising: a transition metal sulfide first electrode (positive electrode), wherein the transition metal has a capacity $C_{TM}$ ($C_{TM} = PUNC + PCYC + POCC$); a lithium alloy second electrode (negative electrode), wherein the lithium has a capacity $C_L$ ($C_L = NUNC + NCYC + NOCC$), and wherein the second electrode is characterized by a high lithium activity phase (richer in lithium than in the normal cycled range) as full cell charge is approached; and an electrolyte disposed between the first and second electrodes and having high lithium solubility to allow for chemical transfer of lithium from the first to the second electrode during charging and an increased self-discharge current from the second to the first electrode in preventing overcharging of the first electrode.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 4A-4F is a graphical representations of the advantageous and disadvantageous combinations of the capacity ranges of electrodes in a cell; FIG. 4F shows that the relationship specified by y between the quantities of aluminum and the other matrix metal (Si) determines the capacity ratios of the NUNC, NCYC and NOCC sections;

DETAILED DESCRIPTION OF THE PREFERRED EMBODIMENT

Figures 1, 6:
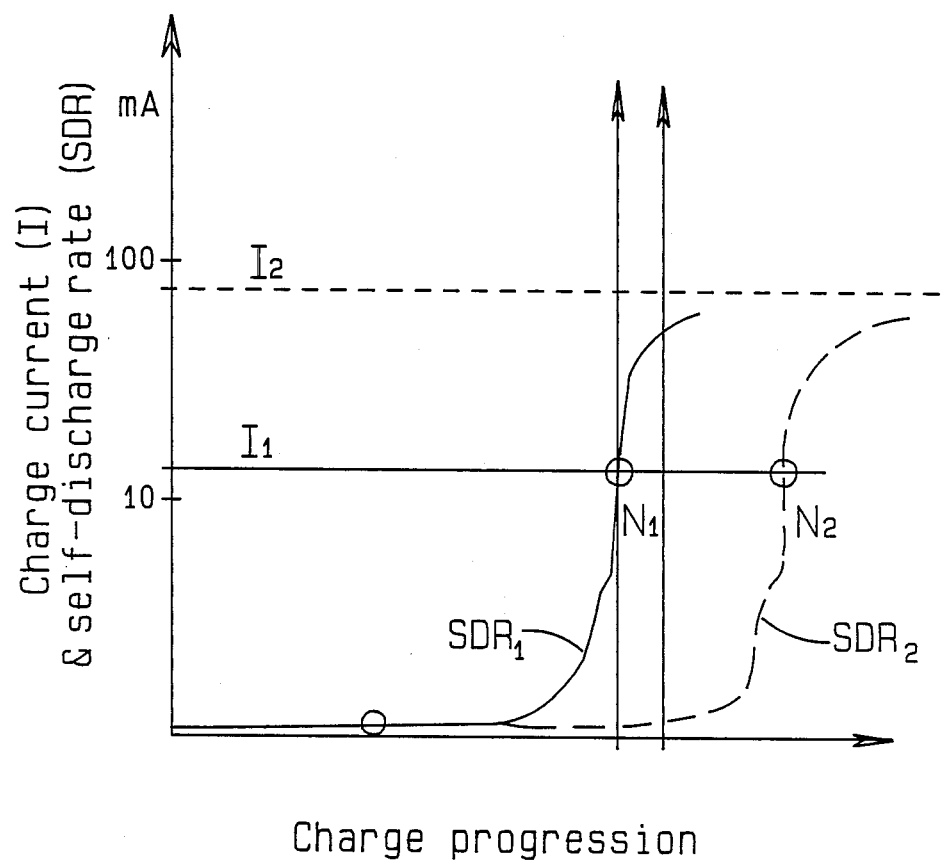
FIG. 1 is a simplified schematic diagram of an overcharge tolerant high-temperature lithium-alloy/metal sulfide cell in accordance with the present invention.
FIG. 6 is a graphic comparison of charge current level (I) and self-discharge rate (SDR) at different stages of lithium-alloy/metal sulfide cell charge in accordance with the present invention.

The present invention contemplates the use of electrolyte dissolved $Li^0$ for overcharge protection in a lithium-alloy/metal chalcogenide cell. The cell is in the form of three layers as shown in simplified schematic diagram form in FIG. 1. In one embodiment, the negative electrode in the operating phase is comprised of LiAlSi, while the positive electrode in the operating phase is comprised of a metal chalcogenide. An immobilized electrolyte comprised of a lithium containing molten salt is disposed between the electrodes.

Although various metal chalcogenides such as NbSe, $V_2O_5$ can be selected for use in the positive electrode, in a preferred embodiment, metal sulfide comprised of FeS, $Li_2FeS_2$, NiS, $NiS_2$, CoS or $CoS_2$, or a mixture of them is selected. The immobilized electrolyte in a preferred embodiment is comprised of a mixture of MgO powder and molten salt, which is, in turn, a mixture of either 22 m % LiF-31 M % LiCl-47 m % LiBr or 25 m % LiCl-37 m % LiBr-38 m % KBr salts. The negative electrode as fabricated in a preferred embodiment is comprised of $Li_xAl$ or $Li_x(Al_ySi_{1-y})$ where $$0 < y < 1$$

and $$X \leq [1.13y + 4(1-y)].$$

Lithium may also be supplied in the positive electrode as $Li_2S$, if that is desired for ease of fabrication. The total lithium in the electrodes as $Li_x(Al_y.Si_{1-y})$ and $Li_2S$ must total at least $1.13y + 4(1-y)$.

In the formula of $Li_x(Al_y Si_{1-y})$, the parenthetical part shows the composition of the matrix metal in the negative electrode. Also, other matrix metals than Al-Si are available for use according to this invention such as AlFe, AlNi, AlCo, or Al or Si alone if y is one of the two extremes in the above inequality. In addition to the charge current density the composition of the matrix metal controls the potential of the negative electrode during the overcharge protecting lithium shuttle ($\epsilon_5$), thereby providing a means of design control for $\epsilon_5$ and options of Li° flux intensity and immobilizing materials in the electrolyte. The melting point of the high lithium activity phase at potential $\epsilon_5$ is another important design parameter. The melting point associated with the potential $\epsilon_5$ must not be lower than the temperature of the cell operation. Consequently, according to this invention the melting point of the electrolyte and the temperature of the cell operation must be adjusted to the properties of the high lithium activity phase of $\epsilon_5$ potential. The following example shows this principle. According to this invention, another useful negative electrode material that produces the high lithium activity phase at the end of the charge is a B+γ phase LiAl alloy (50-70 at % Li). This alloy can be used at lower operating temperatures of the battery (permitted by the melting point of the electrolyte). For example, an $Li_{0.6}Al_{0.4}$ alloy is applicable safely without melting up to 400° C. and an $Li_{0.68}Al_{0.32}$ alloy may be used up to 330° C. Use of the LiAl alloy in overcharge proof cells requires electrolytes of low melting point, e.g., LiCl-LiBr-KBr (m.p. 310° C.) or LiBl-KBr-CsBr (m.p. 238° C.

Previous experiments have shown that lithium alloys equilibrate with an electrolyte containing molten lithium salts resulting in the release of Li° into the melt. This solution is a powerful reducing agent which in the cell reacts with the positive electrode to cause self-discharging of the cell. The lithium solution has a considerable electronic conductivity for increased cell self-discharge. The closer the potential of the lithium alloy to that of pure lithium, the greater is the Li° concentration in the electrolyte and the more intense is the self-discharge of the cell due to an enhanced Li° transport rate to the positive electrode. Although these phenomena are generally considered disadvantageous for cell operation because it lowers current efficiency, the present invention makes use of a controlled, variable self-discharge rate to provide a chemical overcharge protection mechanism while sacrificing little in the way of coulombic efficiency. Previous cell designs and charge operations tried to prevent formation of any dissolved overcharge products by limiting the charge cell voltage. According to this invention the high concentration of the electrolyte dissolved Li° is preferred. Furthermore, the cell voltage control is not of high importance because the cell equalization is executed primarily under current control conditions. Consequently, the battery of this invention requires only simple standard charges.

Lithium alloys at low potentials (at about −170V and below vs. Li-Al reference electrode) can maintain a sufficiently high concentration of the dissolved lithium to be utilized in the chemical overcharge protection of the present invention. If the cell is designed so that this condition of the negative electrode is reached only at the end of the charge half-cycle and before the positive electrode reaches the critical high detrimental potential ($\epsilon_2$), a useful process can be implemented. This process is based on any one of the following reactions.

$$2FeS + 2Li° \rightarrow Li_2FeS_2 + Fe \qquad \text{Eq. 1}$$

or $$Li_2FeS_2 + 2Li° \rightarrow Fe + 2Li_2S \qquad \text{Eq. 2}$$

or $$FeS_2 + 2Li° \rightarrow Li_2FeS_2 \qquad \text{Eq. 3}$$

The chemical reactions set forth in Equations 1, 2 and 3 counterbalance the anodic and cathodic formation of the electrode active materials as set forth in Equations 4, 5 and 6 and described below. Consequently, the associated electrochemical-chemical cycle, the lithium shuttle mechanism (LSM), maintains a steady state in the cell in spite of the continued charge current and prevents overcharging of the positive electrode. This basic principle of the chemical overcharge protection of metal sulfide cells by the lithium shuttle mechanism was engineered into a cell design as described in the following paragraphs.

In describing in detail the present invention in terms of the capacity relationships of the positive and negative electrodes, several new capacity terms are used in the following discussion. Each capacity term is associated with a certain well-defined section on the charge/discharge curves as shown, for example, in FIGS. 2 and 3. Each section on the charge/discharge curves plays an important, distinct role in cell operation. The lithium alloy electrode, or negative electrode, has three sections: (1) unused capacity (NUNC); (2) cycled capacity (NCYC); and (3) overcharged section (NOCC). The NUNC term represents the $\alpha$-Al and (1:1:1) LiAlSi phases of the alloy; these are normally not utilized in cycles because of their poor electrode kinetics. The NOCC section is in the range in which the alloy reaches a more negative potential as evidenced in the negative electrode potential curve in FIG. 2. In this high lithium activity condition the lithium alloy electrode releases Li° into the electrolyte at a rate sufficient to set up an effective lithium shuttle mechanism. Similarly, for a positive electrode in an overcharge tolerant cell in accordance with the present invention three operational sections can be assigned: the unused capacity section (PUNC), which is normally not utilized; the cycled capacity section (PCYC); and the overcharge section (POCC). The aforementioned terms for the positive electrode should be understood in terms of their relationship to the aforementioned capacity sections of the negative electrode as shown in FIGS. 3 and 4A–4F.

Figures 4A, 4B, 4C, 4D, 4E, 4F:
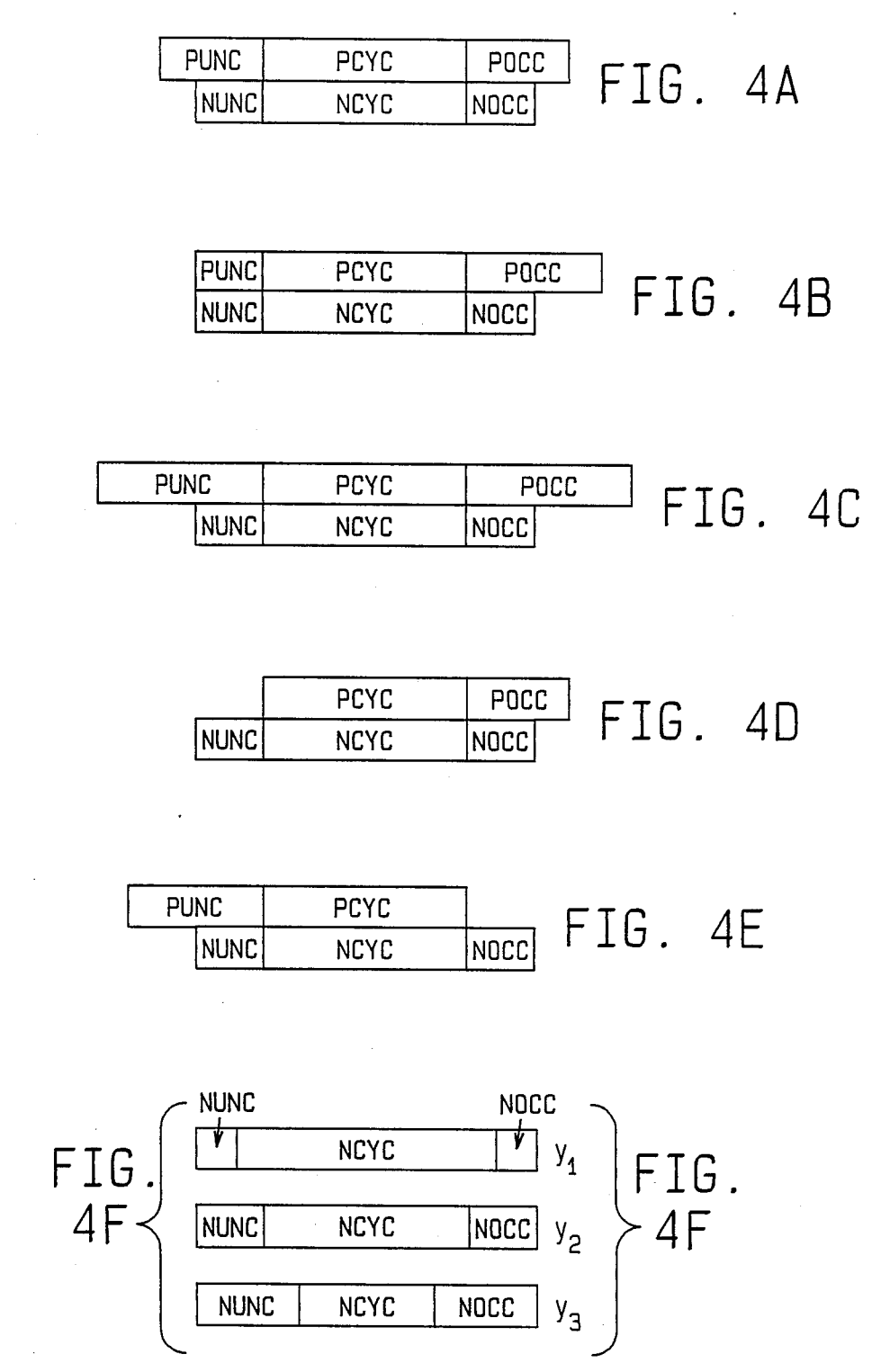

FIGS. 4A–4F illustrate advantageous and disadvantageous combinations of capacity ranges with FIGS. 4A and 4B showing good overcharge protection and high specific energy, FIG. 4C showing good overcharge protection and lower specific energy, FIG. 4D showing good overcharge protection and FIG. 4E showing no overcharge protection. FIG. 4F shows the relationship specified by y between the quantities of aluminum and other matrix metal where $y_3 > y_2 > y_1$, particularly in the value $[1.13y + 4(1-y)]$ discussed above.

The POCC section, which is based on the Li$_2$S and Fe content of the positive electrode that must be in excess to the PCYC composition, provides lithium ions to overcharge the negative electrode for effecting the lithium shuttle mechanism while being oxidized anodically. The corresponding positive electrode reactions are set forth in Equations 4 and 5 as follows:

$$Fe + 2Li_2S = Li_2FeS_2 + 2Li^+ + 2e^- \qquad \text{Eq. 4}$$

and $$Fe + Li_2FeS_2 = 2FeS + 2Li^+ + 2e^- \qquad \text{Eq. 5}$$

The reaction taking place at the negative electrode is set forth in Equation 6 as follows:

$$2Li^+ + 2e^- = 2Li° \qquad \text{Eq. 6}$$

The capacity ratios of these six sections determine whether overcharge tolerance can exist in a cell and whether a cell has sufficient specific energy and power as shown in FIGS. 4A–4F.

On the other hand, the capacity ratios of the six sections are determined and fixed by the quantities of the active material components used at the fabrication of the cell as described below. Usually, the NOCC and POCC sections are a little over designed to give allowance for impurity effects and aging that render a part of the active lithium ineffective during the cycle life of the battery. Also, some additional Li$_2$S, over the quantity required by the POCC section, is advantageous to suppress dissolution of transition metal salts.

The lithium-alloy/metal sulfide cell of the present invention was designed so that its positive electrode remains in the PCYC section during the main part of the cycling and enters the POCC section towards the end of charge when the negative electrode reaches its NOCC section. These important features of the cell of the present invention are graphically illustrated in FIGS. 2 and 3 wherein it can be seen that the positive FeS electrode potential remains under the critical potential ($\epsilon_2$) at which the irreversible anodic dissolution of the active material would occur, and under the potential ($\epsilon_1$) at which a properly chosen positive current collector material would be anodically dissolved. The critical potentials, $\epsilon_1$ and $\epsilon_2$, are easily measurable by a reference electrode, e.g., by the one described in U.S. Pat. No. 4,414,093. On the other hand, the negative LiAlSi electrode potential reaches a value ($\epsilon_5$) that is adequate to maintain an effective lithium shuttle. $\epsilon_3$ represents the potential of the protected positive electrode during Li° shuttle and $\epsilon_4$ represents the potential of the negative electrode in the cycled range. The three distinct operating sections of the lithium-alloy/metal sulfide cell are illustrated along the abscissa in the graph of FIG. 2 as NUNC, NCYC and NOCC. The leveling curves at high $Q_m$ values, when the cell approaches the end of the charge cycle, indicate the overcharge tolerant condition maintained by the 10 mA/cm$^2$ current density of the trickle charge current. The heavy dotted sections of the electrode potential and charge curve represent an unwanted situation, i.e., the absence of overcharge tolerance. This phenomena is encountered in prior art cells when the charge current is set at too high an intensity and is not compensated for by the lithium shuttle mechanism of the present invention. Other prior art cells have demonstrated another basis for the lack of overcharge tolerance. In these latter prior art cells, the performance of the positive electrode is too low to accept the Li° flux that otherwise might have been available for the lithium shuttle mechanism. In the middle portions of the curves shown in FIG. 2, a 100 mA/cm² current density was applied during charge as well as during discharge.

The presence of the NUNC range is very important. Although the low cell voltage and poor kinetics are accompanied by a decrease in cell performance, this section is useful because it provides an overdischarge capacity as well as an indication of the approaching complete exhaustion of the negative electrode. Overdischarge tolerance of cells is important when cell equalization is considered in batteries.

Investigations of LiAlSi/LiF-LiCl-LiBr/FeS cells have shown that, depending upon the conditions, 3-15 mA/cm² current density of the charge current can be tolerated without overcharging the positive electrode. This current density is sufficient for charging of the cells, but does not represent a detrimental overcharging threat for the positive active material or current collector. The LiAlSi alloy is an advantageous negative electrode material. In addition to featuring chemical overcharge protection, the LiAlSi alloy provides chemical overdischarge indication and protection in the NUNC section by indicating the approach of the complete exhaustion of the negative electrode when the cell/battery voltage and power drop to a very low value. This section may also serve as a reserve capacity.

Any negative electrode having a low-high transient step in terms of Li° dissolution in the electrolyte may be used in a lithium-alloy/metal sulfide cell in accordance with the present invention.

The practical implementation of the chemical overcharge protection of the present invention requires a Li° flux which is of low intensity (equivalent to <1 ma/cm²) in the normal operating range of the cell and increases to a high intensity towards the end of charge when the overcharging protection is needed. Another important criteria in carrying out the present invention is that the charge current must not exceed the intensity of the Li° flux in the end section of the charge. These requirements can be satisfied by a combination of the proper capacity ratios (FIGS. 4-4F) and various charging techniques described herein. A good cell design ensures high current efficiency and good cell performance while providing overcharge tolerance.

The lower the potential of the high lithium activity phase ($\epsilon_5$) the higher the intensity of the lithium shuttle. Temperature increase also increases the Li° flux. Therefore, higher temperature and lower $\epsilon_5$ permit a higher intensity safe cell charge equalizing current. However, both temperature and $\epsilon_5$ of the equalizing process must comply with the melting point criterion of the high lithium activity phase as described above.

Figure 2:
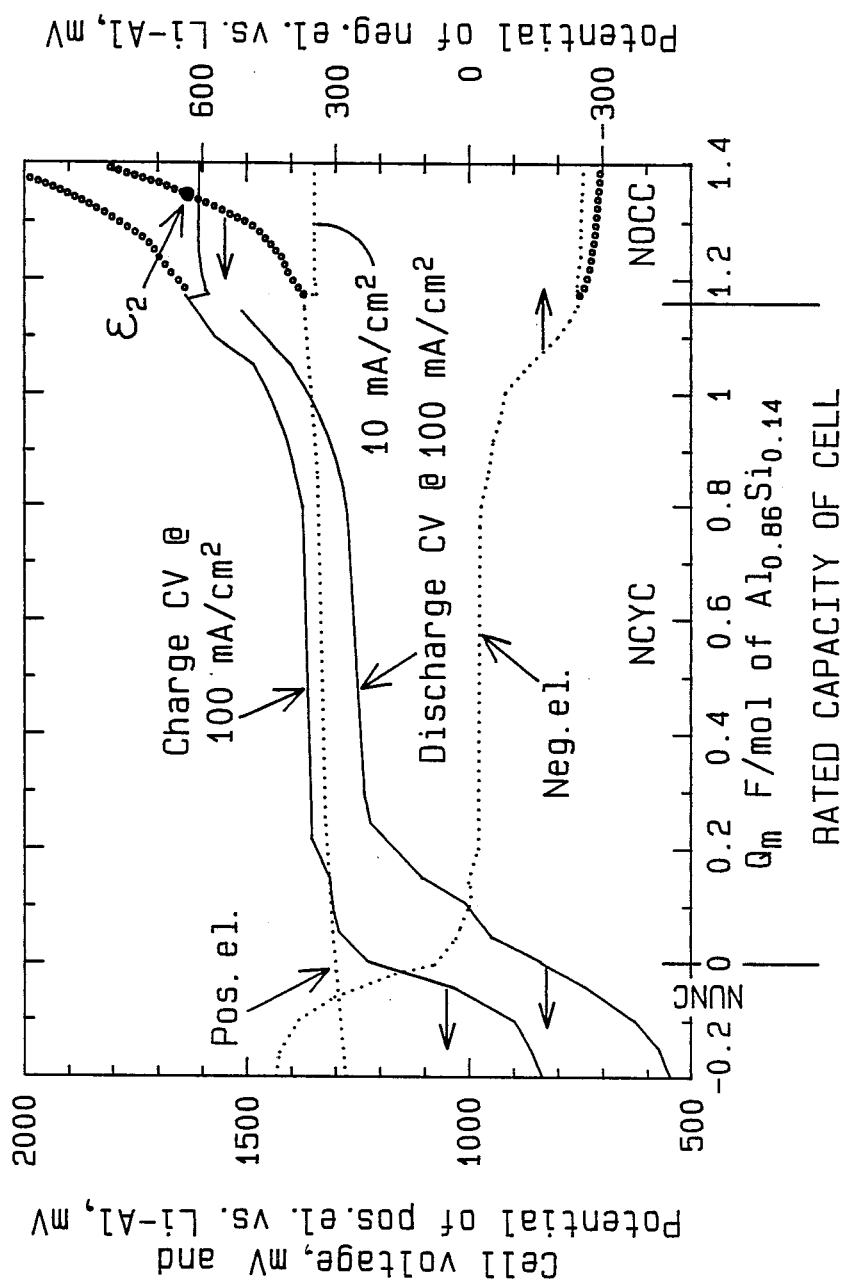
FIG. 2 is a graphic illustration of the variation of cell voltage and electrode potentials during discharge and charge with changes in the degree of charge of a lithium-alloy/metal sulfide cell in accordance with the principles of the present invention.

The lithium-alloy/metal sulfide cell having the charge/discharge curves illustrated in FIG. 2 was constructed with the following parameters:

Negative electrode: $Li_{1.30}Al_{0.86}Si_{0.14}$, 1.54-mm thick, 115 mAh/cm² cycled capacity (NCYC).

Separator: 9.6LiF-22.0LiCl-68.4LiBr+25MgO (in wt %), 2.0-mm thick.

Positive electrode: $Li_{0.52}Fe_{1.10}S_{1.24}$, 1.92-mm thick, 194 mAh/cm² PUNC+PCYC+POCC capacity.

These electrode material formulas do not indicate real compounds; they merely represent electrode compositions that are normalized to 1 mole of the negative matrix material (Al and Si). The electrodes were prepared by mixing LiAl and $Li_xSi$ alloy powders (where x>3) for the negative electrode and FeS—Fe—$Li_2S$ powders for the positive electrode in ratios that satisfy the specified formulas. It is important that the POCC section is based on uncharged positive active materials (e.g., Fe+$Li_2S$) to supply Li⁺ions for the lithium shuttle to overcharge the negative electrode according to FIGS. 4A-4F, 5 and 6., i.e., the lithium necessary to maintain the lithium shuttle effective is stored in the POCC section in discharged form. The capacity ranges indicated in FIG. 2 are quantitated by the molar quantity of charge ($Q_m$) and are given in units normalized to one mole of the negative matrix material (F/mol of Al+Si).

Figure 3:
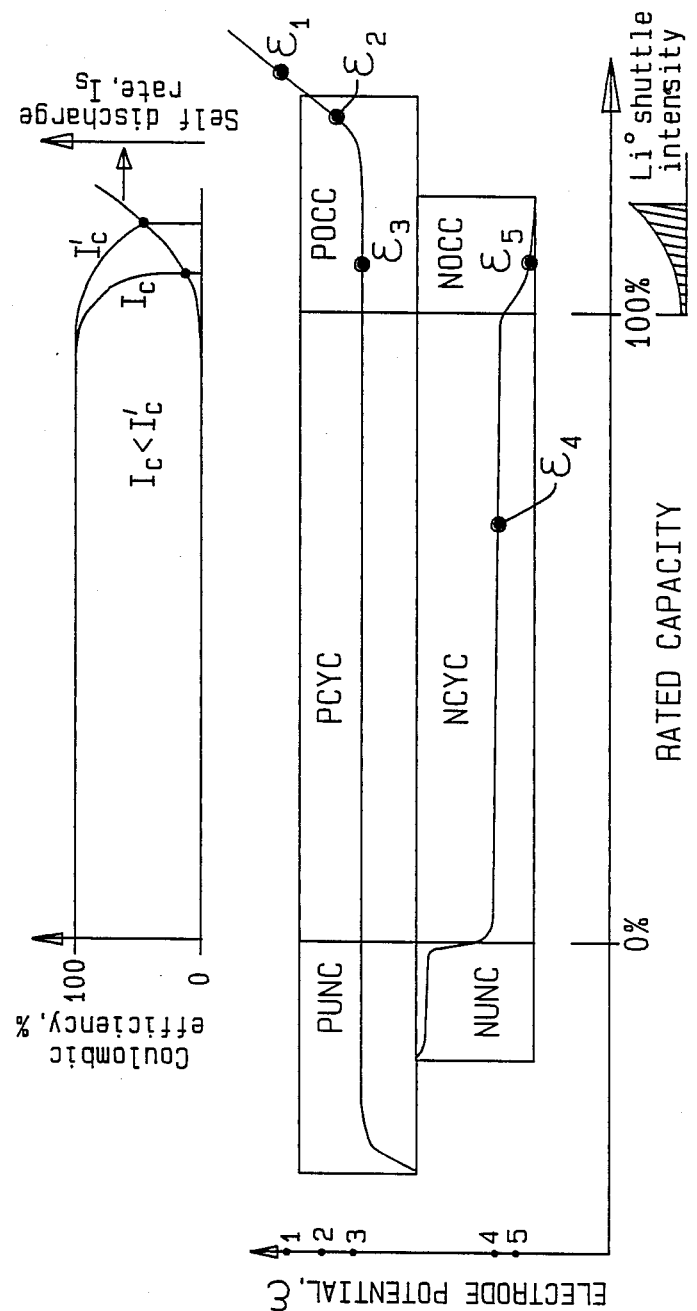
FIG. 3 illustrates the capacity ranges and the critical potentials of the positive and negative electrodes for a lithium-alloy/metal sulfide cell in accordance with the present invention where the capacity ranges are shown in proportion to the areas of the marked fields; the upper part of the figure shows the variation of the coulombic efficiency when the charge progresses from the cycled range to the overcharge range.

Of the three sections shown in FIG. 2, overcharge protection is the most important for the present invention. In this section, the charge curve reaches a constant cell voltage. This curve was obtained at a charge current less than the highest possible self-discharge rate under these conditions. The highest possible self-discharge rate is, in turn, related to the potential of the negative electrode and is controlled by mass-transport limitations of Li°. FIG. 2 shows a charge half-cycle in which the current density was reduced from 100 mA/cm² to 10 mA/cm² when the cell voltage reached 1.63V. The cell is designed such that the capacity ratios of the sections for the positive and negative electrodes as shown in FIG. 2 dictate a low self-discharge rate in the NCYC section and high rates toward the end of the charging in the NOCC section. FIG. 3 illustrates the capacity ranges of the positive and negative electrodes and their relationships in the cell characterized by the charge/discharge cell voltage curves illustrated in FIG. 2. Capacities of the ranges illustrated in FIG. 3 are in proportion to the areas of the marked fields.

Achieving a high cell discharge rate is facilitated by the rapid decrease of the negative electrode potential, as shown by the potential curve for the LiAlSi electrode. At the same time, the potential of the positive electrode increases only slightly and remains well below the critical value ($\epsilon_2$) which is approximately 1.60V vs. a Li-Al reference electrode under the conditions of the experiment.

An important criterion of the effective overcharge protection is that the cell voltage increase is due to the negative electrode to a major extent. The positive electrode potential may increase a little, but does not approach the critical potential ($\epsilon_2$ or $\epsilon_1$). Establishment of the important potentials of a cell design and setting conditions for permissible charge methods are part of the fabrication process and are executed by means of a reference electrode.

The flat end section of the charge curve indicates that the cell has reached a steady-state. The steady-state condition is brought about by the aforementioned lithium shuttle mechanism described above in terms of the various aforementioned equations. By virtue of this lithium shuttle mechanism, the lithium dissolves from the overcharged negative electrode and diffuses to the positive electrode where it is consumed by the positive active material in a chemical reaction. The high rate of this reaction in the NOCC section, facilitated by proper design and charge conditions, counterbalances the anodic and cathodic formation of the electrode active materials and terminates the charge in a steady state, before the onset of the detrimental anodic dissolution of the positive electrode materials. The resulting 0% coulombic efficiency of the charge current under this condition of the lithium shuttle mechanism results in overcharge tolerance and provides a means for cell equalization in batteries. Because of the nature of the lithium shuttle mechanism, the charge current can be continued for any length of time without any net effect on the cell if the steady state is maintained. Since the self-discharge rate in the main part of the operational range of the battery is low and becomes high only at the end of charge during cell equalization, the coulombic efficiency of cycling is high.

According to this invention, the NOCC and POCC sections do not increase the utilization capacity of the cell because they disappear due to self-discharge when the charge current is interrupted. This is in contrast to U.S. Pat. No. 4,324,846 that teaches the use of a specified utilizable overcharge capacity.

This overcharge protection mechanism is not limited to the LiAlSi/FeS cell. Combinations of other Li-alloys and metal sulfides will yield a technically exploitable Li-shuttle mechanism. In practical application, the self-discharge rate must switch from a low level during the bulk of the charge to a high level at the end of charge.

According to this invention the negative active material can be prepared as (1) a mixture of the lithium alloys of the matrix metals, e.g., (Li—Al)+(Li—Si), (Li—Al)+(Li—Al—Fe), or (Li—Al)+(Li—Si)+(Al—Fe), etc., or (2) ternery or higher order alloys, e.g., (Li—Al—Si), (Li—Al—Si—Fe), or (Li—Al)+(Al—Si—Fe), etc.

There are conditions, however, when the lithium shuttle mechanism cannot keep up with the charge current and a sharp increase in the potential of the positive electrode occurs toward the end of charge. This happens when the charge current intensity is higher than the available self-discharge rate because either the reaction of lithium with the positive electrode is slow or the mass-transport resistance of the separator is too high. The upper broken line) in FIG. 2 shows the increasing cell voltage due to the rising potential of the positive electrode (lower heavy broken line) when the charge current density is kept constant at 100 mA/cm$^2$.

Figure 5:
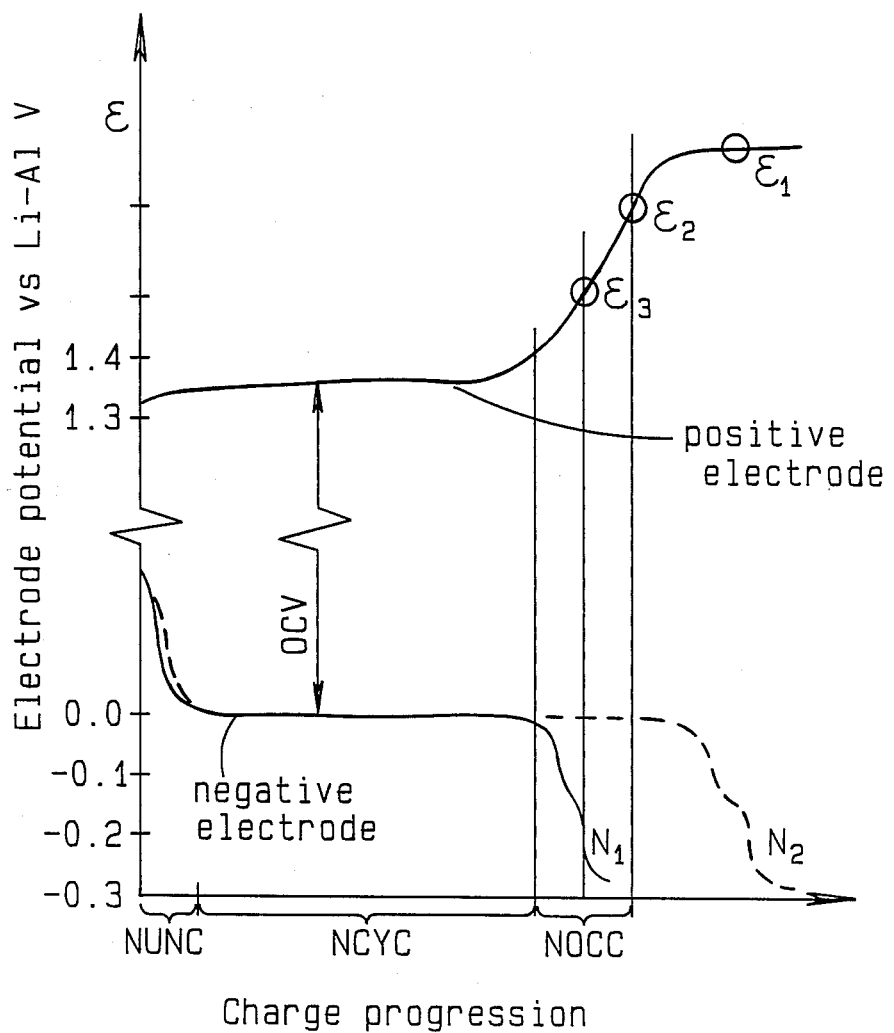
FIG. 5 is a graphic representation of the variation of the difference in positive and negative electrode potentials in terms of charge progression during charge and overcharge in a lithium-alloy/metal sulfide cell in accordance with the present invention.

Referring to FIG. 5, there is shown another illustration of the potential variation of the electrodes of a lithium-alloy/metal sulfide cell in accordance with the present invention during charge and overcharge. The curves labeled N$_1$ and N$_2$ represent two versions of the negative electrodes, with the curve labeled N$_2$ representing a cell which cannot provide overcharge protection provided by the present invention.

Referring to FIG. 6, there is shown a comparison of charge current level (I) with the self-discharge rate (SDR) at different stages of charge of the cell. The negative electrode (N$_1$) protects against charge current level I$_1$ by maintaining SDR$_1$=I$_1$ condition at the potential $\epsilon_3$ of the positive electrode (compare to FIG. 5). The negative electrode represented by the curve N$_2$ in FIG. 6 does not protect against charge current level I$_1$. Similarly, neither of the self-discharge rates illustrated in FIG. 6 provides overcharge protection against a charge current level of I$_2$.

There has thus been shown a lithium-alloy/metal sulfide cell which affords overcharge protection by increasing its self-discharge rate by a selected sequence of electrochemical phase transformations in providing the necessary capacity relationships of the positive and negative electrodes during various phases of cell charging as shown in FIG. 4A–4F. In this approach, the self-discharge rate increases to a level at least two times the level maintained at early states of charge before the positive electrode potential can reach a detrimentally high value ($\epsilon_1$ or $\epsilon_2$). In addition, the charge current level at the end of the charge cycle is maintained equal to the increased self-discharge current to prevent cell damage by overcharging.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A chemical overcharge protection arrangement for a re-chargeable electrochemical cell characterized by variation of lithium content of a negative electrode of the cell as the cell is cycled between charged and discharged states, said arrangement comprising:
   a positive, first electrode;
   a negative, lithium alloy, second electrode, wherein said second electrode is characterized by a high lithium-activity phase which is richer in lithium than in the normal cycled range as full cell charge is approached; and
   an electrolyte disposed between said first and second electrodes and having high lithium solubility to allow for chemical transfer of lithium from the first to the second electrode during charging and an increased self-discharge current from the second to the first electrode in preventing overcharging of said first electrode.

2. The electrochemical cell of claim 1 wherein:
   the positive electrode includes a transition metal sulfide with a transition metal having a capacity of PUNC+PCYC+POCC; and
   the negative electrode includes lithium combined with a matrix metal having a capacity of NUNC+NCYC+NOCC, with POCC extending to a higher capacity than NOCC.

3. The electrochemical cell of claim 2 wherein said electrolyte is comprised of a molten salt.

4. The electrochemical cell of claim 3 wherein said molten salt electrolyte includes lithium salt.

5. The electrochemical cell of claim 4 wherein said molten salt electrolyte further includes MgO powder.

6. The electrochemical cell of claim 5 wherein said molten salt electrolyte includes a mixture of 22 m % LiF—31 m % LiCl—47 m % LiBr salts.

7. The electrochemical cell of claim 5 wherein said molten salt electrolyte includes a mixture of Li Cl—LiBr—KBr salts.

8. The electrochemical cell of claim 2 wherein said positive electrode is selected from the group comprised of FeS, Li$_2$FeS$_2$, FeS$_2$, NiS, Ni$_3$S$_2$, NiS$_2$, CoS, CoS$_2$ and mixtures thereof.

9. The electrochemical cell of claim 2 wherein said positive electrode is comprised of FeS—Fe—Li$_2$S.

10. The electrochemical cell of claim 2 wherein the lithium alloy in said negative electrode has a higher melting point than an operating temperature of the cell.

11. The electrochemical cell of claim 2 wherein said negative electrode is comprised of Li$_x$Al.

12. The electrochemical cell of claim 2 wherein said negative electrode is comprised of lithium, aluminum and silicon.

13. The electrochemical cell of claim 2 wherein said negative electrode is comprised of $Li_x(Al_ySi_{1-y})$ alloy, where $0<y<1$ and $x \leq [1.13y+4(1-y)]$ and additional lithium is included as $Li_2S$ in the positive electrode to provide a total lithium amount in these forms of at least $1.13y+4(1-y)$.

14. The electrochemical cell of claim 2 wherein said negative electrode includes a lithium alloy selected from the group consisting of Li—Al—Fe, Li—Al—Ni, Li—Al—Co and Li—Al—Fe—Si.

15. A method of chemical overcharge protection for an electrochemical cell comprising:

providing a positive electrode including transition metal chalcogenide with a transition metal capacity of PUNC+PCYC+POCC, a negative, lithium alloy electrode with lithium combined with a matrix metal having a capacity of NUNC+NCYC+NOCC with POCC extending to a higher capacity than NOCC, and an electrolyte between the positive and negative electrodes;

charging the cell to the capacity NUNC+NCYC at a first charge rate to increase the transfer rate of Li° from the negative electrode into the electrolyte; and charging the cell to beyond the capacity NCYC at a second charge rate balanced by Li° transport from the negative to the positive electrode and by Li+ migration from the positive to the negative electrode.

16. The method of claim 15 wherein said first charge rate is more than said second charge rate.

17. The method of claim 15 wherein the charging is interrupted between the first and second charge rates.

18. The method of claim 15 wherein said electrochemical cell is in a battery of electrochemical cells and cells of lower charge are permitted to reach full charge and fully charged cells are protected.

* * * * *